United States Patent
Lv et al.

(10) Patent No.: US 11,609,154 B2
(45) Date of Patent: Mar. 21, 2023

(54) FLAT-BELT TYPE VTEHIL TEST BENCHES FOR COMMERCIAL VEHICLES

(71) Applicant: SHANGHAI DIGAUTO AUTOMOBILE TECHNOLOGY CO., LTD., Shanghai (CN)

(72) Inventors: Jiming Lv, Shanghai (CN); Xiaoying Li, Shanghai (CN); Libo Dong, Shanghai (CN); Guanglei Bai, Shanghai (CN); Yu Qiu, Shanghai (CN)

(73) Assignee: SHANGHAI DIGAUTO AUTOMOBILE TECHNOLOGY CO., LTD., Shanghai (CN)

( * ) Notice: Subject to any disclaimer, the term of this patent is extended or adjusted under 35 U.S.C. 154(b) by 36 days.

(21) Appl. No.: 17/397,492

(22) Filed: Aug. 9, 2021

(65) Prior Publication Data
US 2022/0178791 A1 Jun. 9, 2022

(30) Foreign Application Priority Data
Dec. 3, 2020 (CN) .......................... 202011405305.2

(51) Int. Cl.
*G01M 17/06* (2006.01)
*G01M 17/013* (2006.01)

(52) U.S. Cl.
CPC ........ *G01M 17/065* (2013.01); *G01M 17/013* (2013.01)

(58) Field of Classification Search
CPC ............. G01M 17/065; G01M 17/013; G01M 17/0074
See application file for complete search history.

(56) References Cited

U.S. PATENT DOCUMENTS 4,953,391 A * 9/1990 Schober ............ G01M 17/0074
73/118.01
5,111,685 A * 5/1992 Langer .............. G01M 17/0074
73/118.01

(Continued)

FOREIGN PATENT DOCUMENTS

DE 102013219471 A1 * 3/2015 ........ G01M 17/0074

*Primary Examiner* — Eric S. McCall
*Assistant Examiner* — Timothy P Graves
(74) *Attorney, Agent, or Firm* — Rabin & Berdo, P.C.

(57) ABSTRACT

Disclosed in this invention is a flat-belt type VTEHIL test bench for commercial vehicles, including a main bench body and a bench test system. The main bench body is mounted inside a foundation and includes a main bench frame, a bench cover, front axle flat-belt assemblies and rear axle flat-belt assemblies. Each front axle flat-belt assembly is provided therein with a fixed plate, a rotary disc and a limiting mechanism. Each rear axle flat-belt assembly includes a flat belt and flat belt pulleys disposed both within the flat belt at opposing ends thereof. The foundation defines a sector-shaped mounting depression in which the main bench body is mounted, and an iron floor is arranged under the main bench body. This invention can better simulate actual driving surfaces and accommodate two-axle, three-axle, four-axle and other types of trucks or tractors. The test bench is able to test unmanned driving capabilities of intelligent commercial vehicles by allowing them to take lane changing, turning, braking and other driving actions in simulated setups and providing them with various traffic scenarios created with simulated traffic participants.

17 Claims, 6 Drawing Sheets

(56) References Cited

U.S. PATENT DOCUMENTS 5,337,600 A * 8/1994 Kaneko .................... G01L 3/22
                                                          73/116.07
10,801,924 B2   10/2020 Lv et al.

\* cited by examiner

FLAT-BELT TYPE VTEHIL TEST BENCHES FOR COMMERCIAL VEHICLES

TECHNICAL FIELD

The present invention relates to the field of testing of intelligent vehicles and, in particular, to flat-belt type VTEHIL test benches for commercial vehicles.

BACKGROUND

Many automotive manufacturers are strategically investing in research and development of intelligent vehicles. With the development of various supporting technologies and the implementation of related laws and regulations, the mass production of intelligent vehicles can be expected soon, and they will gradually come into our daily lives and finally become part of the future's highly safe intelligent transportation without manual intervention.

To date, we have witnessed increasing intelligence of passenger vehicles and the marketization of some passenger vehicles equipped with a L3 autonomy system a time ago. However, the intelligence of commercial vehicles seems to grow relatively slowly, and there have been no commercial vehicle models with autonomous driving capabilities seen in the marketplace. Nonetheless, this is not a reflection of unnecessary intelligence for commercial vehicles. On the contrary, potential reasons for this may include: bulky size, heavy weight and other limiting factors of commercial vehicles; a huge blind spot for the driver, which is relatively more likely to lead to traffic accidents, in particular, with vulnerable traffic participants such as non-motorized vehicles and pedestrians when turning or changing the lane; and typically serious injuries or death resulting from such accidents.

Therefore, design, research and development of intelligence technologies for commercial vehicles is necessary, and intelligent commercial vehicles with autonomous driving capabilities will also gradually replace human drivers. Future unmanned commercial vehicles will become safer traffic participants with a minimized risk of causing traffic accidents.

However, as commercial vehicles are significantly distinct from passenger vehicles in terms of, e.g., size, weight and driving properties, existing test facilities specially designed for assessing unmanned driving performance of intelligent passenger vehicles are not suited to commercial vehicles.

Therefore, there is proposed herein flat-belt type VTEHIL test benches for performing tests relating to the evaluation of unmanned driving capabilities of intelligent commercial vehicles.

SUMMARY

In view of the above-described deficiencies with the prior art, it is an object of the present invention to provide flat-belt type VTEHIL test benches for commercial vehicles, which can satisfy the needs of practical applications.

To this end, the subject matter of the present invention lies in a flat-belt type VTEHIL test bench for commercial vehicles, comprising a main bench body and a bench test system, the main bench body mounted inside a foundation, the main bench body comprising a main bench frame, a bench cover, front axle flat-belt assemblies and rear axle flat-belt assemblies, each front axle flat-belt assembly provided therein with a fixed plate, a rotary disc and a limiting mechanism, each rear axle flat-belt assembly comprising a flat belt and flat belt pulleys disposed both within the flat belt at opposing ends thereof, the foundation defining a sector-shaped mounting depression in which the main bench body is mounted, with an iron floor being arranged under the main bench body and a pivotal support base connecting the iron floor to the main bench body, so that a top surface of the main bench body is flush with a floor surface, the mounting depression provided at a front edge thereof with an arc-shaped guide track, the main bench body provided at a front end thereof with guide wheels engaging the arc-shaped guide track, the main bench body configured to support thereon a commercial vehicle under test with front wheels resting on the front axle flat-belt assemblies so that the front axle flat-belt assemblies turn independently with the steer wheels and rear wheels resting on the rear axle flat-belt assemblies.

In a preferred embodiment of the present invention, the limiting mechanism comprises a limiting disc, a fixed base, a pinion, an adjustment shaft, limiting shafts, limiting sleeves and threaded sleeves, the pinion rotatably coupled to the fixed base by a pinion shaft, the limiting shafts disposed symmetrically on both sides of the fixed base, both the adjustment shaft and the limiting shafts disposed horizontally, the adjustment shaft arranged above the pinion.

In a preferred embodiment of the present invention, the adjustment shaft is provided thereon with threads and configured for threaded engagement with the threaded sleeves by means of the threads, wherein the limiting sleeves are slidably disposed over the limiting shafts in symmetry with the threaded sleeves, and wherein linking rods are arranged in symmetry with each other on opposing surfaces of the respective threaded sleeves and of the respective limiting sleeves, and locking blocks are provided on the linking rods.

In a preferred embodiment of the present invention, the locking blocks are positioned at the same horizontal plane as the pinion, and locking notches are formed in the opposing surfaces of the respective two locking blocks.

In a preferred embodiment of the present invention, the limiting disc is disposed under, and fixed to, the rotary disc, and a number of second limiting teeth formed in an outer circumference of the limiting disc are configured to bring the limiting disc into engagement with the pinion.

In a preferred embodiment of the present invention, vehicle parameters input to the bench test system, including maximum power, maximum torque, turning radius, number of drive axles, number of steer axles, number of steering wheel turns and steer wheel angle, together with an autonomous driving robot and traffic scenarios created with various simulated traffic participants, enable multiple tests on autonomous driving capabilities of intelligent commercial vehicles, which can provide massive data that can support the development, testing and verification of unmanned driving capabilities of the intelligent commercial vehicles.

In a preferred embodiment of the present invention, the front axle flat-belt assemblies are further provided with a track adjustment mechanism configured to adjust the distance between the two front axle flat-belt assemblies so as to accommodate various wheel tracks and wheel bases of different commercial vehicles.

The present invention provides the beneficial effects as follows:

(1) The bench employs a flat-belt type dynamometer system, which can better simulate actual driving surfaces and accommodate two-axle, three-axle, four-axle and other forms of trucks or tractors.

(2) The bench is able to test unmanned driving capabilities of intelligent commercial vehicles by allowing them to take lane changing, turning, braking and other driving actions in simulated setups and providing them with various traffic scenarios created with simulated traffic participants.

In these figures, 1 denotes the foundation; 2, the main bench body; 3, the mounting depression; 4, an iron floor; 5, a pivotal support base; 6, an arc-shaped guide track; 8, a main bench frame; 9, the front axle flat-belt assembly; 10, the rear axle flat-belt assembly; 11, a fixed plate; 12, a rotary disc; 13, the limiting mechanism; 14, a bench cover; 15, the track adjustment mechanism; 151, a double output shaft gear reducer; 152, a second drive motor; 153, a shaft coupling; 154, a left-handed lead screw; 155, a right-handed lead screw; 156, a connecting seat; 16, flat belt pulleys; 17, a flat belt supporting base; 18, a flat belt supporting roller set; 19, flat belt supporting rollers; 20, a flat belt; 21, a first drive motor; 22, a flat belt tensioning mechanism; 23, a torque sensor; 31, a pinion; 32, first limiting teeth; 33, a fixed base; 34, limiting shafts; 35, an adjustment shaft; 37, a pinion shaft; 38, threaded sleeves; 39, limiting sleeves; 40, a limiting disc; 41, linking rods; 42, locking blocks; 43, locking notches; and 44, second limiting teeth.

DETAILED DESCRIPTION

Embodiments of the present invention will be described below clearly and thoroughly with reference to the accompanying drawings. It is to be understood that the embodiments disclosed herein are only some but not all possible embodiments of the present invention. It is intended that any other embodiment made in light of the disclosed embodiments by those of ordinary skill in the art without paying creative effort also falls within the scope of the invention.

Figure 1:
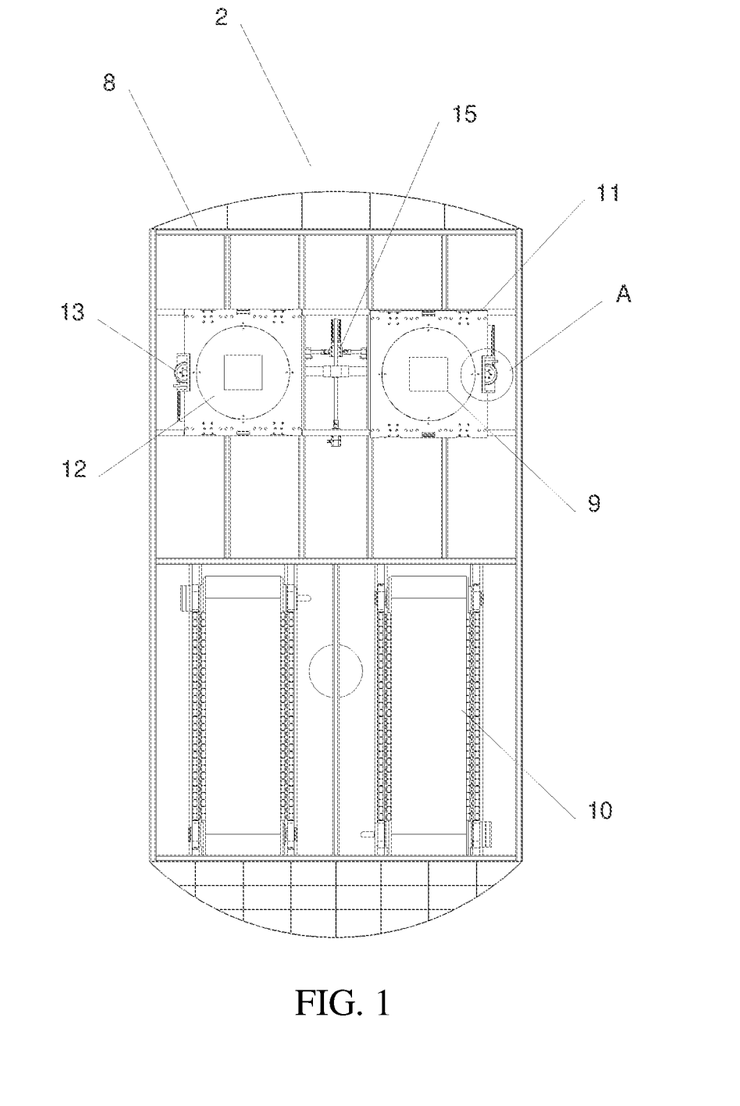
FIG. 1 is a top view of a main bench body of a test bench according to the present invention.

As shown in FIG. 1, the present invention provides a flat-belt type VTEHIL test bench for commercial vehicles, which includes a main bench body 2 and a bench test system supporting and coordinating with the main bench body 2.

As shown, the main bench body 2 includes a main bench frame 8 having a front section provided therein with a pair of front axle flat-belt assemblies 9 and a rear section provided therein with a pair of rear axle flat-belt assemblies 10. Additionally, a pair of fixed plates 11 is provided on the front section of the main bench frame 8, and rotatable rotary discs 12 are arranged on respective central portions of the fixed plates 11. The front axle flat-belt assemblies 9 are mounted at respective centers of the rotary discs 12 on the fixed plates 11 so that they can rotate with the rotary discs 12. Further, a track adjustment mechanism 15 is disposed between the two front axle flat-belt assemblies 9, which can change the distance between the front axle flat-belt assemblies 9, making it possible to accommodate various wheel tracks and wheel bases of different commercial vehicles. Furthermore, limiting mechanisms 13 are disposed external to the respective rotary discs 12 in order to limit their rotation during a test.

Figure 2:
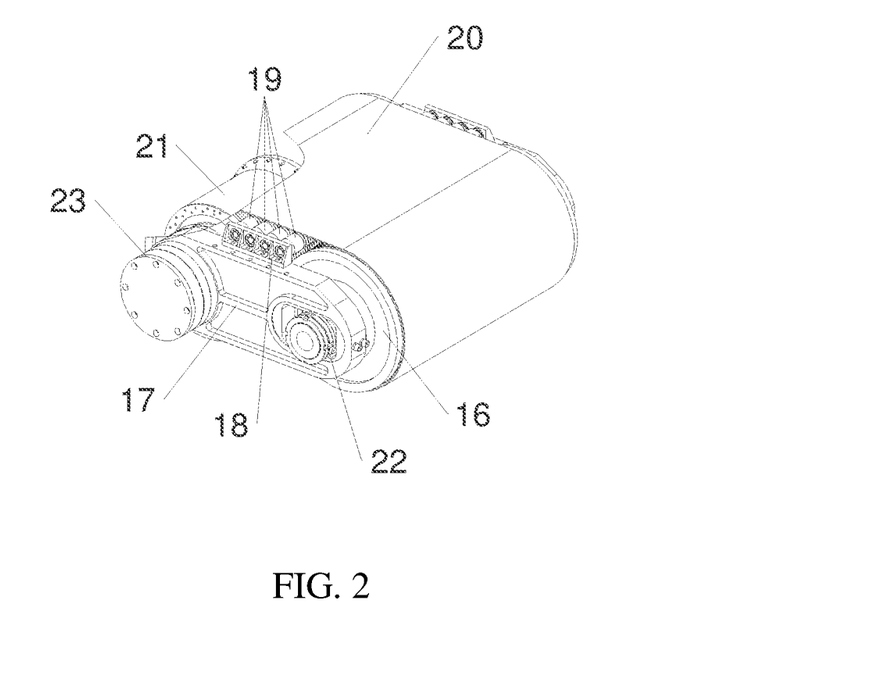
FIG. 2 is a structural schematic of a front axle flat-belt assembly according to the present invention.

As shown in FIG. 2, each front axle flat-belt assembly 9 includes a flat belt supporting base 17, leading and trailing flat belt pulleys 16 disposed on opposing ends of the flat belt supporting base 17, a flat belt supporting roller set 18 arranged above the flat belt supporting base 17 and a flat belt 20 surround both the leading and trailing flat belt pulleys 16 and the flat belt supporting roller set 18. It would be readily appreciated that the flat belt supporting roller set 18 consists of a number of flat belt supporting rollers 19 arranged side by side and the number of them depends on the distance between the leading and trailing flat belt pulleys 16. In addition, at least one of the flat belt pulleys 16 is provided therein with a first drive motor 21 for driving the flat belt pulley 16 to rotate, thus leading movement of the flat belt 20. This arrangement is compact in structure. A torque sensor 23 is disposed on a side surface of one of the flat belt pulleys 16 and configured to detect a torque of the flat belt pulley 16. A flat belt tensioning mechanism 22 is disposed at a side surface of one of the flat belt pulleys 16 and adapted to adjust a tension of the flat belt 20 in real time.

Figure 3:
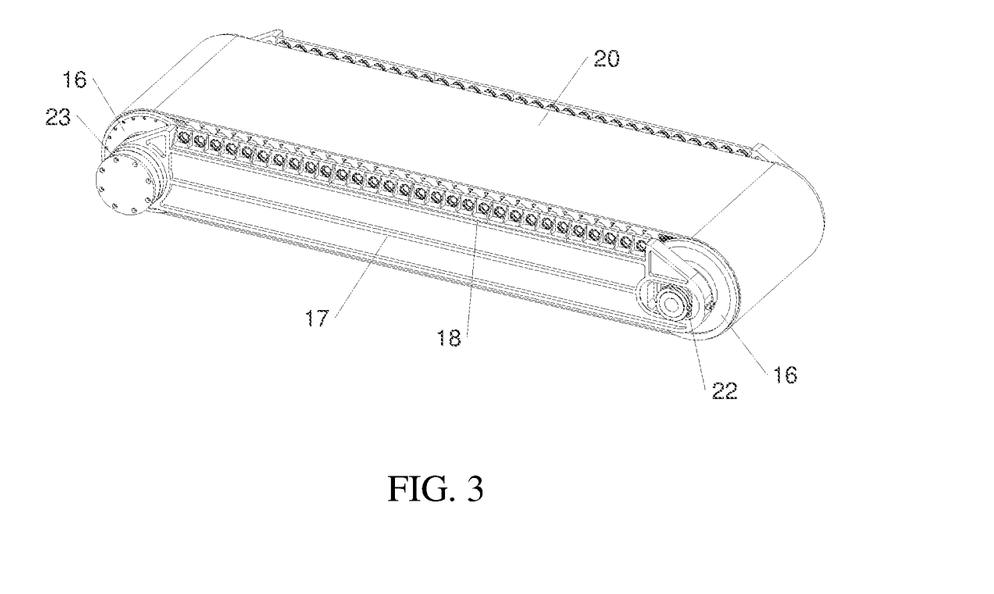
FIG. 3 is a structural schematic of a rear axle flat-belt assembly according to the present invention.

As shown in FIG. 3, each rear axle flat-belt assemblies 10 is structured similarly to the front axle flat-belt assemblies 9 except for a flat belt supporting base 17 with a different length, i.e., a different spacing between leading and trailing flat belt pulleys 16. Compared with traditional roller-type dynamometers, this flat-belt type test bench provides flat moving contact surfaces, which can better simulate actual wheel-to-road surface contact conditions and provide test setups that closely approximate actual environments. Therefore, tests performed and results thereof are of greater significance.

Figure 4:
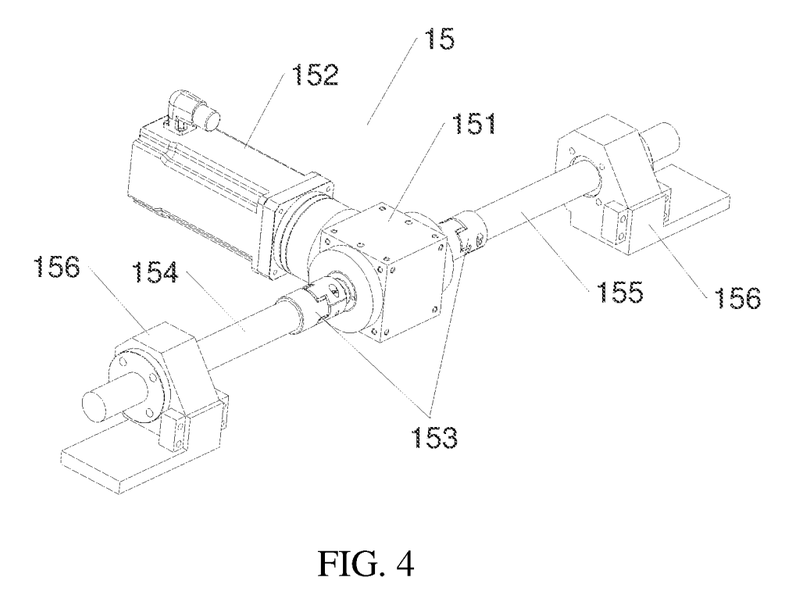
FIG. 4 is a structural schematic of a track adjustment mechanism according to the present invention.

Additionally, as shown in FIG. 4, the track adjustment mechanism 15 includes a double output shaft gear reducer 151, a second drive motor 152, a pair of shaft couplings 153, a left-handed lead screw 154, a right-handed lead screw 155, a pair of nuts (not shown) and a pair of connecting seats 156. The double output shaft gear reducer 151 is fixed to the main bench frame 8 and coupled to the second drive motor 152, with its output shafts being coupled respectively to the left- and right-handed lead screws 154, 155 via the pair of shaft couplings 153. The nuts are disposed in engagement respectively with the left- and right-handed lead screws 154, 155 and are housed in the respective connecting seats 156. Each connecting seat 156 is fixedly connected to the flat belt supporting base 17 of the front axle flat-belt assembly 9 arranged on the same side. Rotation of the second drive motor 152 is speed-reduced by the double output shaft gear reducer 151 and then transmitted in opposite directions to the left- and right-handed lead screws 154, 155, leading the nuts to rotate. As the lead screws rotate in opposite directions, the connecting seats 156 move simultaneously and symmetrically toward or away from each other. As a result, the respective front axle flat-belt assemblies 9 move correspondingly, achieving wheel track adjustments.

The design of this test bench follows a modular concept, in which an arbitrary number, e.g., one or two pairs, of front axle flat-belt assemblies 9 may be added, or a length of the rear axle flat-belt assemblies 10 may be altered, depending on the type of the commercial vehicle under test. In this way, the test requirements of commercial vehicles of various types can be met.

Figure 5:
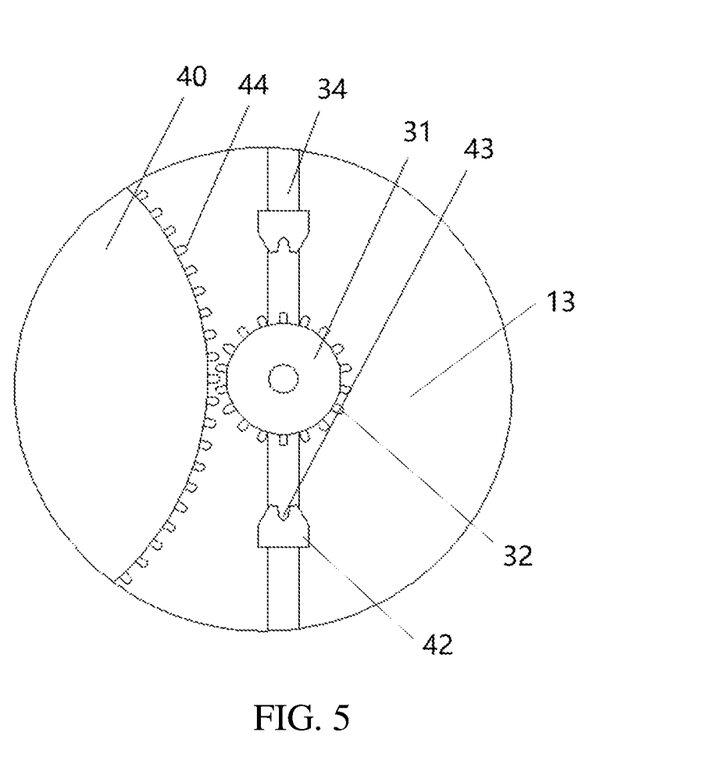
FIG. 5 is an enlarged view of portion A of FIG. 1.
Figure 6:
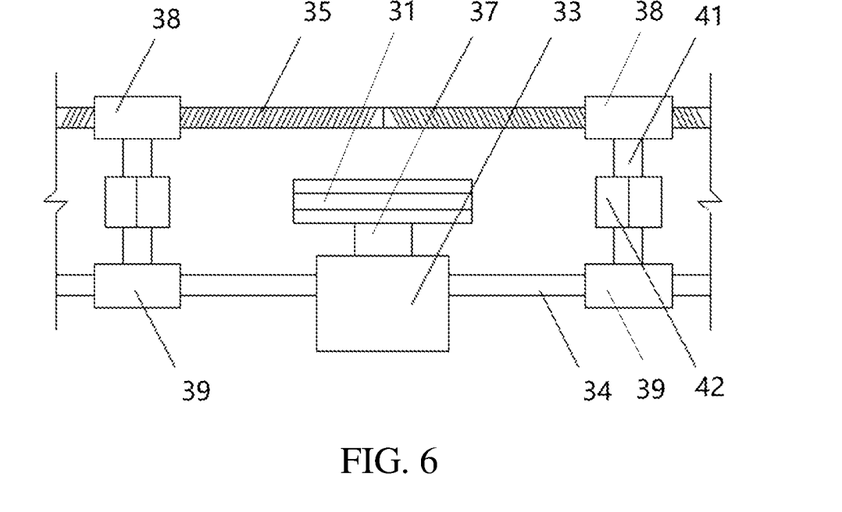
FIG. 6 is a structural schematic of a limiting mechanism according to the present invention.

As shown in FIGS. 5 and 6, each limiting mechanism 13 includes a fixed base 33, a pinion 31, limiting shafts 34, a pair of limiting sleeves 39, an adjustment shaft 35, a pair of threaded sleeves 38, a pair of linking rods 41 and a pair of locking blocks 42.

The pinion 31 is arranged above the fixed base 33 by a pinion shaft 37 and is rotatably coupled to the fixed base 33.

The limiting shafts 34 are horizontally inserted into the fixed base 33 or otherwise disposed symmetrically on opposing sides of the fixed base 33. The limiting sleeves 39 are disposed over the respective limiting shafts 34 on both sides of the fixed base 33.

The adjustment shaft 35 is arranged above the pinion 31 so that it extends in parallel with the limiting shafts 34. The adjustment shaft 35 is provided on its outer surface with threads, which run in opposite directions over different portions of the adjustment shaft 35. Different portions are separated from each other at a middle point of the adjustment shaft 35 that is aligned with the underlying fixed base 33. The threaded sleeves 38 are disposed over the respective opposite threaded portions and are aligned with the respective underlying limiting sleeves 39 on the limiting shafts 34.

The linking rods 41 connect the respective upper threaded sleeves 38 to the respective lower limiting sleeves 39 that are vertically aligned with the respective threaded sleeves 38, and the locking blocks 42 are disposed on the respective linking rods 41 at the same horizontal plane as the pinion 31. Each locking block 42 defines a locking notch 43 at a location in positional correspondence with the pinion 31, which is complementary in shape with first limiting teeth 32 on the pinion 31. That is, the locking notch 43 can engage any of the first limiting teeth 32 on the pinion 31.

A limiting disc 40 is disposed under, and fixedly connected to, the rotary disc 12. The limiting disc 40 defines second limiting teeth 44 at locations along a peripheral edge thereof, which are in positional correspondence with the pinion 31 so as to be able to engage the first limiting teeth 32 thereon.

During a test, when the commercial vehicle drives straight or has turned to a desired angle, the adjustment shaft 35 of the limiting mechanism 13 rotates. Since the threads on the different halves of the adjustment shaft 35 run in opposite directions, the rotation of the threads causes movement of the threaded sleeves 38 on the different halves of the adjustment shaft 35 toward each other horizontally along the adjustment shaft 35, which in turn drives movement of the locking blocks 42 toward each other. Upon the locking notches 43 of the locking blocks 42 moving into engagement with the first limiting teeth 32, the pinion 31 will be locked, disallowing further rotation of the rotary disc 12 in engagement therewith. Thus, the rotary disc 12 is limited from further motion.

Figure 7:
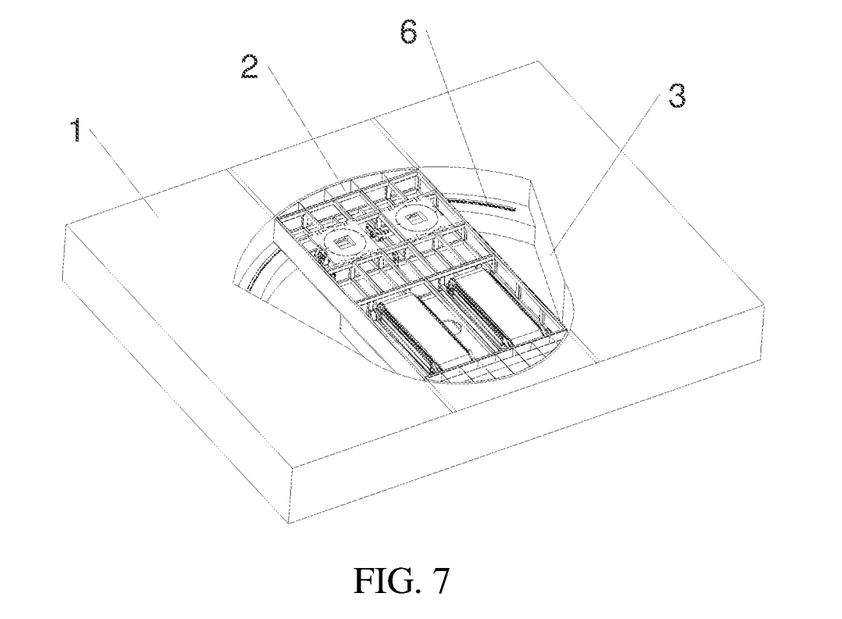
FIG. 7 schematically illustrates how the main bench body is mounted in a foundation according to the present invention.
Figure 8:
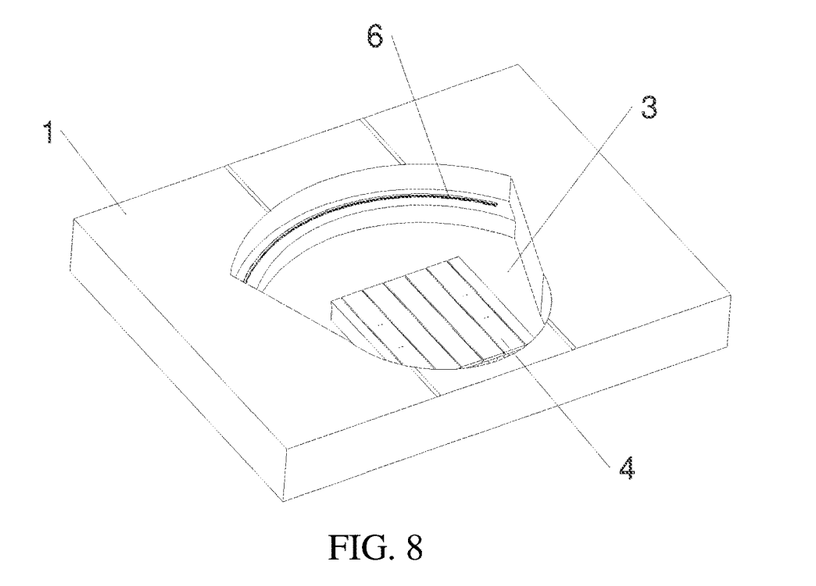
FIG. 8 is a schematic illustration of a mounting depression of the foundation according to the present invention.
Figure 9:
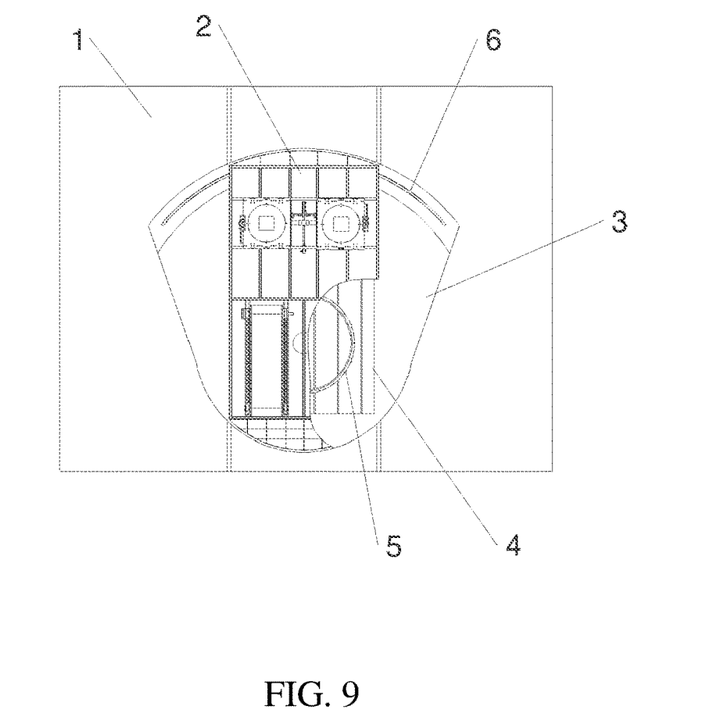
FIG. 9 schematically illustrates how the main bench body is mounted in the foundation from a top view according to the present invention.
Figure 10:
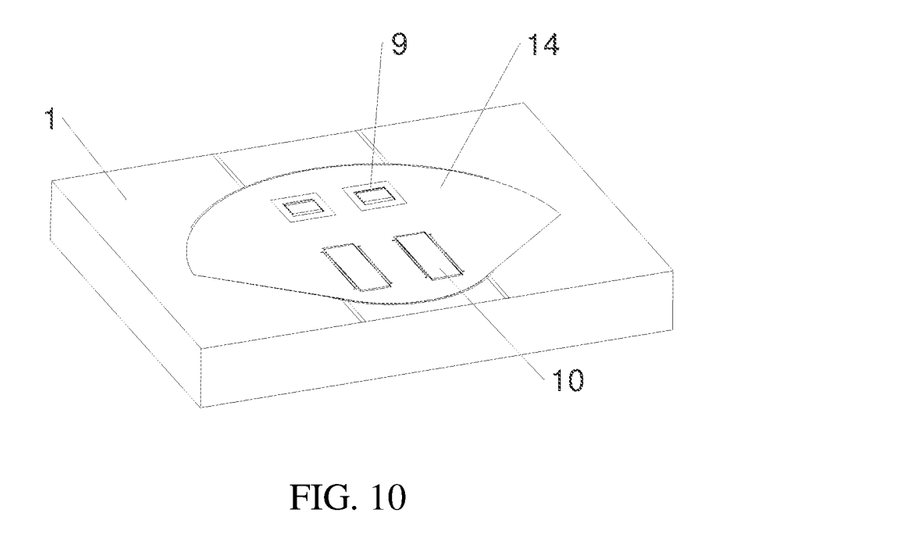
FIG. 10 is a schematic illustration of the test bench according to the present invention.

The main bench body 2 is mounted inside a foundation, or overall directly placed on the floor. Preferably, the main bench body 2 is mounted inside the foundation 1, as shown in FIG. 7. This makes it easy for a commercial vehicle under test to drive onto the test bench. The foundation 1 defines a generally sector-shaped mounting depression 3 with arc-shaped front and rear edges for allowing pivotal movement of the main bench body 2 within the mounting depression 3. Specifically, with combined reference to FIGS. 8 and 9, an arc-shaped guide track 6 is provided at the front end of the foundation 1, and an iron floor 4 is provided at the bottom thereof. At the bottom side of the main bench body 2, guide wheels (not shown) and a pivotal support base 5 are provided in positional correspondence with the arc-shaped guide track 6 and the iron floor 4, respectively. As a result, the main bench body 2 is able to pivot about the pivotal support base 5 within the mounting depression 3, with the aid of the guide wheels moving on the arc-shaped guide track 6. Further, as shown in FIG. 10, a bench cover 14 is provided above the main bench body 2, which is matched in shape with the mounting depression 3 and flush with the surface of the foundation 1.

In this embodiment, the bench test system is implemented as a conventional one including a dynamometer test system, a hardware-in-the-loop simulation test system for complete vehicles and their subsystem assemblies, and a lower hierarchical control system. In addition, extension interfaces employing a common communication protocol are preserved for future functional extension. The dynamometer test system is capable of performance testing and emission testing. The hardware-in-the-loop simulation test system for complete vehicles and subsystem assemblies thereof works with an autonomous driving robot to carry out performance tests and hardware-in-the-loop simulations in relation to intelligent driving of complete vehicles, performance tests and hardware-in-the-loop simulations of subsystem assemblies, and the like. The lower hierarchical control system employs a distributed master-slave control scheme, standard industrial Ethernet communication and real-time control. Typical examples include Beckhoff TwinCat control systems and EtherCAT buses. Control interfaces are preserved for each motion action in order to allow testing both under all the standard conditions prescribed for the proposed device and under user-defined special conditions for their specific applications made available on other compatible simulation platforms.

Figure 11:
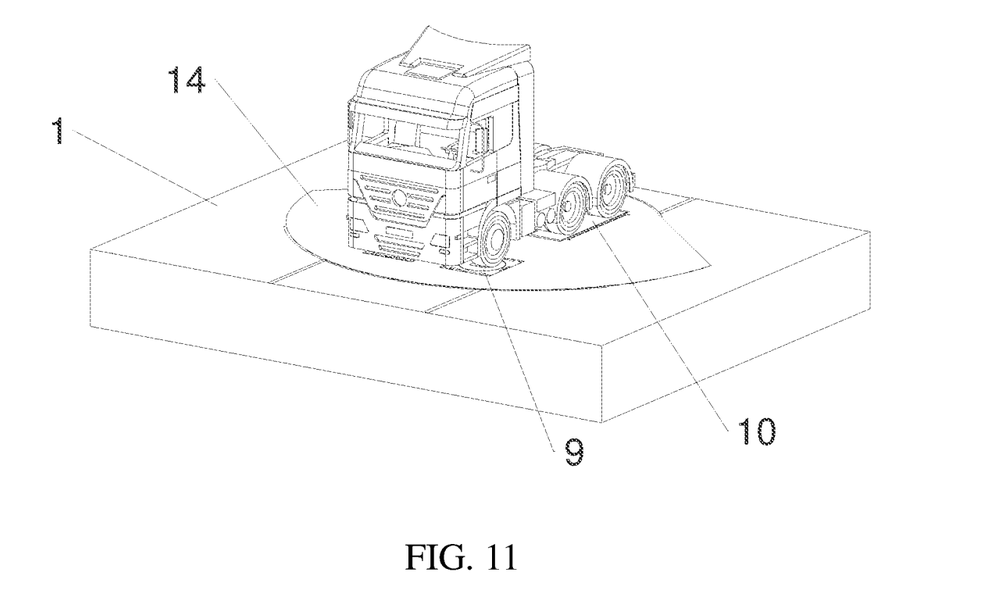
FIG. 11 is a diagram illustrating the test bench in an operating state according to the present invention.

In order to test a commercial vehicle, the track adjustment mechanism 15 first adjusts the distance between the front axle flat-belt assemblies 9 to a value compatible with a front wheel track of the vehicle under test. Then, the vehicle under test is driven onto and parked on the test bench, as shown in FIG. 11, with its front wheels resting on the respective flat belts 20 of the front axle flat-belt assemblies 9 and its rear wheels on the respective flat belts 20 of the rear axle flat-belt assemblies 10. In addition, it is ensured that a path that the vehicle follows when it turns is centered at the center of the pivotal support base 5. Related vehicle parameters, such as maximum power, maximum torque, turning radius, number of drive axles, number of steer axles, number of steering wheel turns and steer wheel angle, are input to the bench test system. The system's powerful capabilities of processing the input data and the proposed device's motion control capabilities, together with the use of the autonomous driving robot and various traffic scenarios created with simulated traffic participants, enable multiple tests on unmanned driving capabilities of intelligent commercial vehicles, which can provide massive data that can support the development, testing and verification of unmanned driving capabilities of the intelligent commercial vehicles.

The invention claimed is:

1. A flat-belt type VTEHIL test bench for commercial vehicles, comprising a main bench body (2) and a bench test system, the main bench body (2) mounted inside a foundation (1), wherein the main bench body (2) comprises a main bench frame (8), a bench cover (14), front axle flat-belt assemblies (9) and rear axle flat-belt assemblies (10), each front axle flat-belt assembly (9) provided therein with a fixed plate (11), a rotary disc (12) and a limiting mechanism (13), each rear axle flat-belt assembly (10) comprising a flat belt (20) and flat belt pulleys (16) both disposed within the flat belt at opposing ends thereof, wherein the foundation (1) defines a sector-shaped mounting depression (3) in which the main bench body (2) is mounted, with an iron floor (4) being arranged under the main bench body (2) and a pivotal support base (5) connecting the iron floor (4) to the main bench body (2), so that a top surface of the main bench body (2) is flush with a floor surface, the mounting depression (3) provided at a front edge thereof with an arc-shaped guide track (6), the main bench body (2) provided at a front end thereof with guide wheels engaging the arc-shaped guide track (6), and wherein the main bench body (2) is configured to support thereon a commercial vehicle under test with front wheels resting on the front axle flat-belt assemblies (9), wherein the front axle flat-belt assemblies (9) are arranged at respective centers of the rotary discs (12) so that the front axle flat-belt assemblies (9) are able to turn independently with the steer wheels and rear wheels resting on the rear axle flat-belt assemblies (10).

2. A flat-belt type VTEHIL test bench for commercial vehicles according to claim 1, wherein the limiting mechanism (13) comprises a limiting disc (40), a fixed base (33), a pinion (31), an adjustment shaft (35), limiting shafts (34), limiting sleeves (39) and threaded sleeves (38), the pinion (31) rotatably coupled to the fixed base (33) by a pinion shaft (37), the limiting shafts (34) disposed symmetrically on both sides of the fixed base (33), both the adjustment shaft (35) and the limiting shafts (34) disposed horizontally, the adjustment shaft (35) arranged above the pinion (31).

3. A flat-belt type VTEHIL test bench for commercial vehicles according to claim 2, wherein the adjustment shaft (35) is provided thereon with threads and configured for threaded engagement with the threaded sleeves (38) by means of the threads, wherein the limiting sleeves (39) are slidably disposed over the limiting shafts (34) in symmetry with the threaded sleeves (38), and wherein linking rods (41) are arranged in symmetry with each other on opposing surfaces of the respective threaded sleeves (38) and of the respective limiting sleeves (39), and locking blocks (42) are provided on the linking rods (41).

4. A flat-belt type VTEHIL test bench for commercial vehicles according to claim 3, wherein the locking blocks (42) are positioned at the same horizontal plane as the pinion (31), and locking notches (43) are formed in the opposing surfaces of the respective two locking blocks (42).

5. A flat-belt type VTEHIL test bench for commercial vehicles according to claim 2, wherein the limiting disc (40) is disposed under, and fixed to, the rotary disc (12), and a number of second limiting teeth (44) formed in an outer circumference of the limiting disc (40) are configured to bring the limiting disc (40) into engagement with the pinion (31).

6. A flat-belt type VTEHIL test bench for commercial vehicles according to claim 1, wherein vehicle parameters input to the bench test system, including maximum power, maximum torque, turning radius, number of drive axles, number of steer axles, number of steering wheel turns and steer wheel angle, together with an autonomous driving robot and various traffic scenarios created with simulated traffic participants, enable multiple tests on unmanned driving capabilities of intelligent commercial vehicles, which can provide massive data that can support the development, testing and verification of unmanned driving capabilities of the intelligent commercial vehicles.

7. A flat-belt type VTEHIL test bench for commercial vehicles according to claim 1, wherein the front axle flat-belt assemblies (9) are provided with a track adjustment mechanism (15) configured to adjust the distance between the two front axle flat-belt assemblies (9) so as to accommodate various wheel tracks and wheel bases of different commercial vehicles.

8. A flat-belt type VTEHIL test bench for commercial vehicles, comprising a main bench body (2), wherein the main bench body (2) comprises a main bench frame (8) having a front section where a pair of front axle flat-belt assemblies (9) is arranged and a rear section where a pair of rear axle flat-belt assemblies (10) is arranged,
  each front axle flat-belt assembly (9) comprising a flat belt supporting base (17), leading and trailing flat belt pulleys (16) disposed at opposing ends of the flat belt supporting base (17), a flat belt supporting roller set (18) disposed above the flat belt supporting base (17) and a flat belt (20) surround both the leading and trailing flat belt pulleys (16) and the flat belt supporting roller set (18),
  each rear axle flat-belt assembly (10) comprising
    a rear flat belt supporting base, longer than the flat belt supporting base (17), the leading and trailing flat belt pulleys being disposed at opposing ends of the rear flat belt supporting base,
    a rear flat belt supporting roller set, longer than the flat belt supporting roller set (18), disposed above the rear flat belt supporting base, and
    a flat belt surround both the leading and trailing flat belt pulleys and the rear flat belt supporting roller set,
  wherein a pair of fixed plates (11) is arranged on the front section of the main bench frame (8), with a rotatable rotary disc (12) being arranged on a central portion of each fixed plate (11),
  wherein the front axle flat-belt assemblies (9) are arranged at respective centers of the rotary discs (12) on the fixed plates (11), and
  wherein a limiting mechanism (13) is disposed external to each rotary disc (12) and is configured to limit rotation of the rotary disc (12) during a test.

9. A flat-belt type VTEHIL test bench for commercial vehicles according to claim 8, wherein a track adjustment mechanism (15) arranged between the two front axle flat-belt assemblies (9) is configured to adjust the distance between the front axle flat-belt assemblies (9).

10. A flat-belt type VTEHIL test bench for commercial vehicles according to claim 9, wherein the track adjustment mechanism (15) comprises a double output shaft gear reducer (151), a second drive motor (152), a pair of shaft couplings (153), a left-handed lead screw (154), a right-handed lead screw (155), a pair of nuts and a pair of connecting seats (156),
  the double output shaft gear reducer (151) fixed to the main bench frame (8) and coupled to the second drive motor (152), the double output shaft gear reducer (151) having output shafts coupled respectively to the left- and right-handed lead screws (154,155) through the pair of shaft couplings (153), the pair of nuts engaging the left- and right-handed lead screws (154,155) and housed within the pair of connecting seats (156), each connecting seat (156) fixedly connected to the flat belt supporting base (17) of the front axle flat-belt assembly (9) on the same side.

11. A flat-belt type VTEHIL test bench for commercial vehicles according to claim 8, wherein at least one of the flat belt pulleys (16) is provided therein with a first drive motor (21) for driving rotation of the flat belt pulley (16), which leads movement of the flat belt (20).

12. A flat-belt type VTEHIL test bench for commercial vehicles according to claim 8, wherein a torque sensor (23) is disposed on a side surface of one of the flat belt pulleys (16) and configured to detect a torque of the flat belt pulley (16).

13. A flat-belt type VTEHIL test bench for commercial vehicles according to claim 8, wherein a flat belt tensioning mechanism (22) is disposed on a side surface of one of the flat belt pulleys (16) and configured to adjust a tension of the flat belt (20) in real time.

14. A flat-belt type VTEHIL test bench for commercial vehicles according to claim 8, wherein one, two or three pairs of front axle flat-belt assemblies (9) is/are included.

15. A flat-belt type VTEHIL test bench for commercial vehicles according to claim 8, wherein the main bench body (2) is mounted in a foundation (1) defining a generally sector-shaped mounting depression (3) having arc-shaped front and rear edges, the foundation (1) provided with an arc-shaped guide track (6) at the front end and an iron floor (4) at the bottom, the main bench body (2) provided at the bottom with guide wheels and a pivotal support base (5) in positional correspondence with the arc-shaped guide track (6) and the iron floor (4), respectively, so that the main bench body (2) is able to pivot about the pivotal support base (5) within the mounting depression (3) with the guide wheels moving on the arc-shaped guide track (6).

16. A flat-belt type VTEHIL test bench for commercial vehicles according to claim 15, wherein a bench cover (14) matched in shape with the mounting depression (3) is disposed above the main bench body (2) so as to be flush with a surface of the foundation (1).

17. A flat-belt type VTEHIL test bench for commercial vehicles according to claim 8, wherein the limiting mechanism (13) comprises a fixed base (33), a pinion (31), limiting shafts (34), a pair of limiting sleeves (39), an adjustment shaft (35), a pair of threaded sleeves (38), a pair of linking rods (41) and a pair of locking blocks (42), the pinion (31) disposed above the fixed base (33) by a pinion shaft (37) and rotatably coupled to the fixed base (33), the limiting shafts (34) horizontally inserted into the fixed base (33) and the pair of limiting sleeves (39) disposed over the limiting shafts (34) that are disposed on opposing sides of the fixed base (33), the adjustment shaft (35) disposed above the pinion (31) in parallel with the limiting shafts (34), the adjustment shaft (35) provided on its outer surface with threads running in opposite directions over its different halves, the pair of threaded sleeves (38) disposed over the different halves of the adjustment shaft (35) in alignment with the underlying pair of limiting sleeves (39) on the limiting shafts (34), each of the pair of linking rods (41) connecting a respective one of the limiting sleeves (39) to a respective one of the threaded sleeves (38) that is vertically aligned with the specific limiting sleeve (39), the pair of locking blocks (42) provided on the pair of linking rods (41) at the same horizontal plane as the pinion (31), each locking block (42) provided with a locking notch (43) at a location thereof in positional correspondence with the pinion (31), the locking notch (43) matched in shape, and able to come into engagement, with any of first limiting teeth (32) on the pinion (31), and wherein the rotary disc (12) is fixed at the bottom to a limiting disc (40), the limiting disc (40) defining second limiting teeth (44) at locations along a peripheral edge thereof, which are in positional correspondence with the pinion (31), the second limiting teeth (44) engageable with the first limiting teeth (32) of the pinion (31).

* * * * *